United States Patent
Ma et al.

(10) Patent No.: US 11,805,490 B2
(45) Date of Patent: Oct. 31, 2023

(54) TIME MEASUREMENT METHOD AND APPARATUS

(71) Applicant: Huawei Technologies Co., Ltd., Shenzhen (CN)

(72) Inventors: Zixiang Ma, Nanjing (CN); Zhihui Zhou, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/689,309

(22) Filed: Mar. 8, 2022

(65) Prior Publication Data
US 2022/0295433 A1 Sep. 15, 2022

(30) Foreign Application Priority Data

Mar. 9, 2021 (CN) .......................... 202110254291.7
May 31, 2021 (CN) .......................... 202110604682.7

(51) Int. Cl.
*H04W 56/00* (2009.01)
(52) U.S. Cl.
CPC ................................. *H04W 56/005* (2013.01)
(58) Field of Classification Search
CPC ... H04W 56/005; H04W 56/00; G01S 13/003; G01S 13/765; G01S 13/767; G01S 13/87; G01S 13/00; G01S 13/76; G01S 5/02; H04L 43/0864
See application file for complete search history.

(56) References Cited

U.S. PATENT DOCUMENTS

| | | | |
|---|---|---|---|
| 9,237,546 B1 * | 1/2016 | Zhang | H04W 4/02 |
| 9,247,446 B2 * | 1/2016 | Das | G01S 13/46 |
| 2007/0110126 A1 * | 5/2007 | Sekiguchi | H04B 1/71632 |
| | | | 375/130 |
| 2011/0292819 A1 * | 12/2011 | Ekbal | G01S 13/765 |
| | | | 370/252 |
| 2013/0223261 A1 * | 8/2013 | Aggarwal | G01S 5/10 |
| | | | 370/252 |
| 2014/0073352 A1 * | 3/2014 | Aldana | G01S 5/10 |
| | | | 455/456.1 |
| 2015/0382152 A1 * | 12/2015 | Lindskog | H04W 64/00 |
| | | | 455/456.2 |
| 2017/0367063 A1 * | 12/2017 | Venkatraman | G01S 5/0236 |
| 2017/0374513 A1 * | 12/2017 | Venkatraman | G01S 5/14 |
| 2018/0160390 A1 * | 6/2018 | Aldana | H04L 43/0864 |
| 2019/0159161 A1 * | 5/2019 | Kakani | G01S 5/08 |
| 2020/0068523 A1 * | 2/2020 | Pan | G01S 11/02 |

(Continued)

*Primary Examiner* — Nathan S Taylor
(74) *Attorney, Agent, or Firm* — Conley Rose, P.C.

(57) ABSTRACT

A time measurement method includes that a first device receives a first packet from a second device using a first antenna. The first device transmits a second packet to the second device using a second antenna. The first device receives an indication for a first transceiving delay from the second device, where the first transceiving delay is a delay from a time at which the second device transmits the first packet to a time at which the second device receives the second packet. The first device determines a round-trip time (RTT) between the first device and the second device based on a calibration delay from the second antenna to the first antenna, a recording moment at which the first device receives the first packet, a recording moment at which the first device transmits the second packet, and the first transceiving delay.

20 Claims, 6 Drawing Sheets

(56) References Cited

U.S. PATENT DOCUMENTS

| | | | |
|---|---|---|---|
| 2020/0205104 A1* | 6/2020 | Akkarakaran | H04W 88/085 |
| 2022/0052726 A1* | 2/2022 | Pon | G01S 11/02 |
| 2022/0053435 A1* | 2/2022 | King | H04B 17/14 |
| 2022/0065979 A1* | 3/2022 | Bao | G01S 5/02216 |
| 2022/0287000 A1* | 9/2022 | Bao | G01S 5/10 |
| 2023/0147008 A1* | 5/2023 | Nilsson | H04W 56/001 370/350 |

* cited by examiner

TIME MEASUREMENT METHOD AND APPARATUS

CROSS-REFERENCE TO RELATED APPLICATION

This claims priority to Chinese Patent Application No. 202110254291.7 filed on Mar. 9, 2021 and Chinese Patent Application No. 202110604682.7 filed on May 31, 2021, both of which are hereby incorporated by reference in their entireties.

TECHNICAL FIELD

This application relates to the field of communication technologies, and in particular, to a time measurement method and apparatus.

BACKGROUND

To avoid a measurement error caused by imprecise clock synchronization, bidirectional signal propagation is used to measure a signal transmission time between two devices in fine timing measurement (FTM). A round-trip time (RTT) of a signal between the two devices may be used to calculate a distance between the two devices.

However, there is a large error in the distance between the two devices that is directly calculated based on a signal receiving moment and a signal transmitting moment respectively recorded by the devices.

SUMMARY

This application provides a time measurement method and apparatus, so as to resolve a problem that there is a large error in a distance between devices that is currently calculated through an FTM technology.

According to a first aspect, a time measurement method is provided. The method includes that a first device receives a first packet from a second device by using a first antenna, the first device transmits a second packet to the second device by using a second antenna, where the first antenna and the second antenna are different antennas in the first device, the first device receives an indication for a first transceiving delay from the second device, where the first transceiving delay is a delay from a time at which the second device transmits the first packet to a time at which the second device receives the second packet, and the first device determines an RTT between the first device and the second device based on a calibration delay from the second antenna to the first antenna, a recording moment at which the first device receives the first packet, a recording moment at which the first device transmits the second packet, and the first transceiving delay, where the calibration delay from the second antenna to the first antenna is a delay in receiving, by the first device by using the first antenna, a wireless signal transmitted by the second antenna.

In this application, the first device first obtains a relative delay from the second antenna to the first antenna as the calibration delay. In a time measurement process in which the first device serves as a measurement initiating end, the first device receives the first packet from the second device by using the first antenna, and transmits the second packet to the second device by using the second antenna. Because the first device performs, based on the calibration delay from the second antenna to the first antenna, delay calibration on the recording moment at which the packet is transmitted by using the second antenna and the recording moment at which the packet is received by using the first antenna, accuracy of the calculated RTT can be improved, and an error in a distance calculated between the devices can be reduced.

Optionally, the indication for the first transceiving delay is a value of the first transceiving delay. Alternatively, the indication for the first transceiving delay includes a transmitting timestamp at which the second device transmits the first packet and a receiving timestamp at which the second device receives the second packet.

Optionally, the first device further transmits a calibration signal by using the second antenna, and receives the calibration signal by using the first antenna. Then, the first device measures a delay for the calibration signal, and records the delay for the calibration signal as the calibration delay from the second antenna to the first antenna.

In this application, the first device transmits the calibration signal to the other antenna by using one antenna, and then obtains the calibration delay from the transmit antenna to the receive antenna by measuring the delay for the calibration signal. A manner in which the first device measures the calibration delay from the transmit antenna to the receive antenna is relatively simple, and a calculation time consumed by the first device is also relatively short. Therefore, fast calibration of the transceiving delay can be implemented.

Optionally, $\Delta T1 = t2 - t1$. $\Delta T1$ is the delay for the calibration signal, $t1$ is a recording moment at which the second antenna transmits the calibration signal, and $t2$ is a recording moment at which the first antenna receives the calibration signal.

The delay for the calibration signal calculated in this application includes an air interface delay for transmitting the calibration signal from the second antenna to the first antenna. On one hand, the distance between the first antenna and the second antenna is usually small, and the air interface delay from the second antenna to the first antenna is also small. The air interface delay has little impact on a calculation result of the calibration delay from the second antenna to the first antenna. Therefore, the air interface delay from the second antenna to the first antenna may be ignored. On the other hand, when calculating the calibration delay from the second antenna to the first antenna, the first device usually cannot learn of a relative position between the second device and the first device. Therefore, when calculating the calibration delay from the second antenna to the first antenna in this application, the air interface delay from the second antenna to the first antenna is usually not considered.

Optionally, $RTT = \Delta T2 - (t4 - t3) - \Delta T1$. RTT is the RTT between the first device and the second device, $\Delta T1$ is the calibration delay from the second antenna to the first antenna, $t3$ is the recording moment at which the first device receives the first packet, $t4$ is the recording moment at which the first device transmits the second packet, and $\Delta T2$ is the first transceiving delay.

Optionally, a quantity of antennas in the first device is greater than 2, and the first antenna and the second antenna are two antennas that correspond to the second device and that have maximum received signal strength in a plurality of antennas in the first device.

Optionally, the first device records a plurality of groups of correspondences between calibration delays and transmit and receive antennas. In response to a correspondence that is recorded in the first device and that is between a target calibration delay and transmit and receive antennas, the first device uses the target calibration delay as the calibration delay from the second antenna to the first antenna, where the transmit antenna is the second antenna and the receive antenna is the first antenna.

In this application, the first device may measure and record calibration delays of a plurality of antennas in advance, and after determining to use the first antenna to receive the packet from the second device and use the second antenna to transmit the packet to the second device, the first device may directly obtain, based on the correspondence, the calibration delay corresponding to the transmit and receive antennas, where the transmit antenna is the second antenna and the receive antenna is the first antenna. In this way, efficiency of obtaining the calibration delay from the second antenna to the first antenna is improved.

Optionally, the first packet is an FTM frame, and the second packet is an acknowledgment frame. Before the first device receives the first packet from the second device by using the first antenna, the first device further transmits the FTM request frame to the second device, where the FTM request frame is used to request to measure the RTT between the first device and the second device.

Optionally, the first device transmits a third packet to a third device by using a third antenna. The first device receives a fourth packet from the third device by using a fourth antenna, where the third antenna and the fourth antenna are different antennas in the first device. The first device calibrates, based on a calibration delay from the third antenna to the fourth antenna, a recording moment at which the first device transmits the third packet and/or a recording moment at which the first device receives the fourth packet, to obtain an indication for a second transceiving delay, where the second transceiving delay is a delay from a time at which the first device transmits the third packet to a time at which the first device receives the fourth packet, and the calibration delay from the third antenna to the fourth antenna is a delay in receiving, by the first device by using the fourth antenna, a wireless signal transmitted by the third antenna. The first device transmits the indication for the second transceiving delay to the third device.

In this application, the first device first obtains a relative delay from the third antenna to the fourth antenna as the calibration delay. In a time measurement process in which the first device serves as a measurement responding end, the first device transmits the third packet to the third device by using the third antenna, and receives the fourth packet from the third device by using the fourth antenna. Because the second transceiving delay is a delay obtained after the first device calibrates, based on the calibration delay from the third antenna to the fourth antenna, the recording moment at which the packet is transmitted by using the third antenna and the recording moment at which the packet is received by using the fourth antenna, when the third device determines an RTT between the third device and the first device by using the second transceiving delay, accuracy of the calculated RTT can be improved, and an error in a distance calculated between the devices can be reduced.

Optionally, the indication for the second transceiving delay is a value of the second transceiving delay. Alternatively, the indication for the second transceiving delay includes a transmitting timestamp at which the first device transmits the third packet and a receiving timestamp at which the first device receives the fourth packet. The transmitting timestamp at which the first device transmits the third packet is obtained by calibrating, based on the calibration delay from the third antenna to the fourth antenna, the recording moment at which the first device transmits the third packet, and/or the receiving timestamp at which the first device receives the fourth packet is obtained by calibrating, based on the calibration delay from the third antenna to the fourth antenna, the recording moment at which the first device receives the fourth packet. In other words, the transmitting timestamp at which the first device transmits the third packet is the recording moment at which the first device transmits the third packet, and the receiving timestamp at which the first device receives the fourth packet is obtained by calibrating, based on the calibration delay from the third antenna to the fourth antenna, the recording moment at which the first device receives the fourth packet. Alternatively, the transmitting timestamp at which the first device transmits the third packet is obtained by calibrating, based on the calibration delay from the third antenna to the fourth antenna, the recording moment at which the first device transmits the third packet, and the receiving timestamp at which the first device receives the fourth packet is the recording moment at which the first device receives the fourth packet. Alternatively, the transmitting timestamp at which the first device transmits the third packet is obtained by calibrating, based on the calibration delay from the third antenna to the fourth antenna, the recording moment at which the first device transmits the third packet, and the receiving timestamp at which the first device receives the fourth packet is obtained by calibrating, based on the calibration delay from the third antenna to the fourth antenna, the recording moment at which the first device receives the fourth packet.

Optionally, $\Delta T4=t6-t5-\Delta T3$. $\Delta T4$ is the second transceiving delay, $t5$ is the recording moment at which the first device transmits the third packet, $t6$ is the recording moment at which the first device receives the fourth packet, and $\Delta T3$ is the calibration delay from the third antenna to the fourth antenna.

According to a second aspect, a first device is provided. The apparatus includes a plurality of function modules, and the plurality of function modules interact with each other to implement the method according to the first aspect and the implementations of the first aspect. The plurality of function modules may be implemented based on software, hardware, or a combination of software and hardware, and the plurality of function modules may be randomly combined or divided based on specific implementation.

According to a third aspect, a first device is provided, including a transceiver and a plurality of antennas.

The transceiver is configured to receive a first packet from a second device by using a first antenna in the plurality of antennas, and transmit a second packet to the second device by using a second antenna in the plurality of antennas, where the first antenna and the second antenna are different antennas in the plurality of antennas.

The transceiver is further configured to receive an indication for a first transceiving delay from the second device, where the first transceiving delay is a delay from a time at which the second device transmits the first packet to a time at which the second device receives the second packet.

The transceiver is further configured to determine an RTT between the first device and the second device based on a calibration delay from the second antenna to the first antenna, a recording moment at which the first device receives the first packet, a recording moment at which the first device transmits the second packet, and the first transceiving delay, where the calibration delay from the second antenna to the first antenna is a delay in receiving, by the first device by using the first antenna, a wireless signal transmitted by the second antenna.

According to a fourth aspect, a first device is provided, including a processor, a memory, a transceiver, and a plurality of antennas.

The transceiver is configured to receive a first packet from a second device by using a first antenna in the plurality of antennas, and transmit a second packet to the second device by using a second antenna in the plurality of antennas, where the first antenna and the second antenna are different antennas in the plurality of antennas.

The transceiver is further configured to receive an indication for a first transceiving delay from the second device, where the first transceiving delay is a delay from a time at which the second device transmits the first packet to a time at which the second device receives the second packet.

The processor is configured to invoke a computer program stored in the memory, so as to determine an RTT between the first device and the second device based on a calibration delay from the second antenna to the first antenna, a recording moment at which the first device receives the first packet, a recording moment at which the first device transmits the second packet, and the first transceiving delay, where the calibration delay from the second antenna to the first antenna is a delay in receiving, by the first device by using the first antenna, a wireless signal transmitted by the second antenna.

According to a fifth aspect, a computer-readable storage medium is provided, where the computer-readable storage medium stores instructions, and when the instructions are executed by a processor of an access point, the method in the first aspect and the implementations of the first aspect is implemented, or when the instructions are executed by a processor of a radio controller, the method in the second aspect and the implementations of the second aspect is implemented.

According to a sixth aspect, a chip is provided, where the chip includes a programmable logic circuit and/or program instructions, and when the chip runs, the method in the first aspect and the implementations of the first aspect is implemented.

DESCRIPTION OF EMBODIMENTS

To make objectives, technical solutions, and advantages of this application clearer, the following further describes implementations of this application in detail with reference to the accompanying drawings.

A time for transmitting a wireless signal between two devices is positively correlated with an actual distance between the two devices. Therefore, the distance between the two devices may be calculated by using a signal transmission time between the two devices. To avoid a measurement error caused by imprecise clock synchronization, bidirectional signal propagation may be used to measure the signal transmission time between the two devices. In other words, an RTT between the two devices may be calculated. The RTT between the two devices mentioned in the embodiments of this application refers to an RTT for the wireless signal between the two devices.

Figure 1:
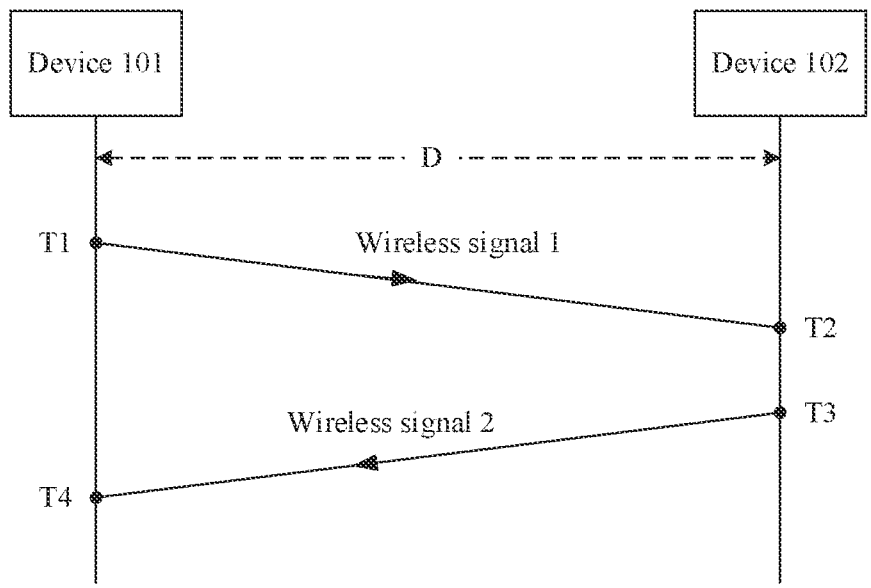
FIG. 1 is a schematic diagram of an implementation scenario related to a time measurement method according to an embodiment of this application.

For example, FIG. 1 is a schematic diagram of an implementation scenario related to a time measurement method according to an embodiment of this application. As shown in FIG. 1, this implementation scenario includes a device 101 and a device 102. Optionally, this implementation scenario is applied to a wireless local area network (WLAN). The device 101 is an access point (AP) or a station (STA), and the device 102 is an AP or a STA. Alternatively, the implementation scenario is applied to a mobile cellular network. The device 101 is a base station or user equipment (UE), and the device 102 is a base station or UE. Alternatively, the device 101 and the device 102 may be other communications devices. The application scenario related to the provided time measurement method is not limited in this embodiment of this application.

Refer to FIG. 1. The device 101 transmits a wireless signal 1 to the device 102 at a moment T1, and the device 102 receives the wireless signal 1 at a moment T2. The device 102 transmits a wireless signal 2 to the device 101 at a moment T3, and the device 101 receives the wireless signal 2 at a moment T4. In this case, a distance D between the device 101 and the device 102 and an RTT between the device 101 and the device 102 meet $RTT=(T4-T1)-(T3-T2)=2D/c$, where c represents a propagation speed of the wireless signal in an air medium, and a value of c is usually a speed of light.

T1, T2, T3, and T4 all refer to moments for transmitting and receiving the wireless signal at air interfaces. Actually, a device can obtain only a signal receiving moment and a signal transmitting moment that are recorded in the device. The device may record the signal receiving moment and the signal transmitting moment by using hardware. For example, when a signal arrives at specified hardware in the device, the hardware is triggered to automatically record an arrival moment of the signal. The signal receiving moment and the signal transmitting moment that are recorded by using the hardware may be referred to as hardware recording moments. Alternatively, a device may record a signal receiving moment and a signal transmitting moment by using software. For example, after processing a signal, specified software in the device automatically records a moment at which the signal is transmitted. The signal receiving moment and the signal transmitting moment that are recorded by using the software may be referred to as software recording moments. In the following embodiments of this application, a recording moment at which a device transmits or receives a signal (or a packet) may be a hardware recording moment, or may be a software recording moment.

Figure 2:
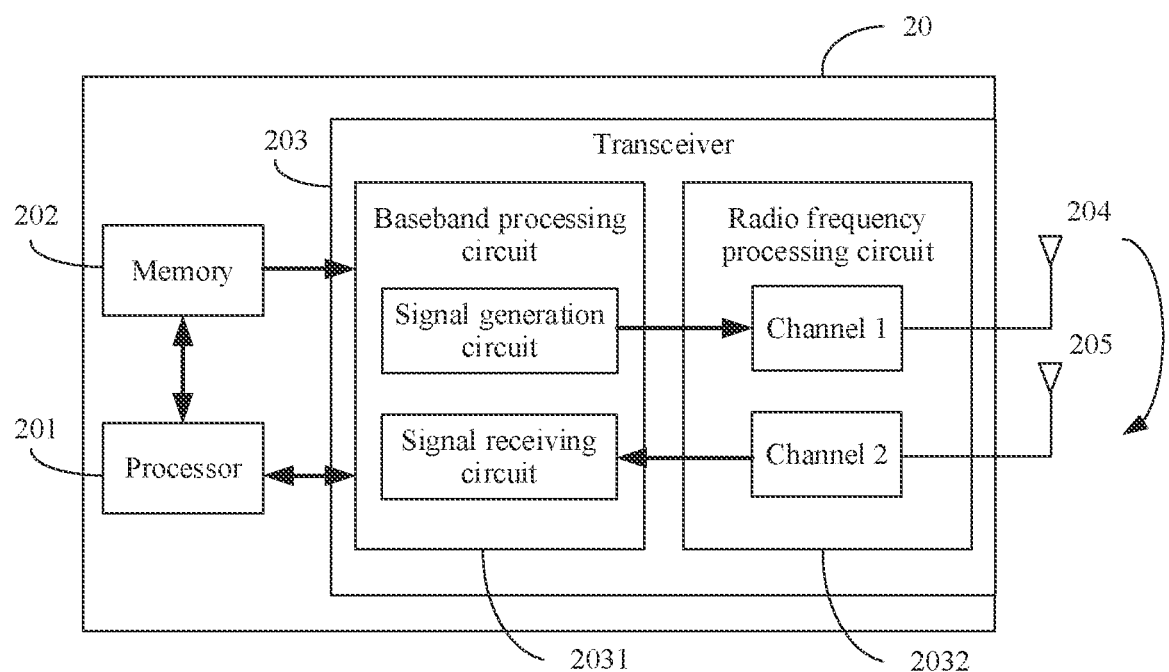
FIG. 2 is a schematic diagram of a hardware structure of a device according to an embodiment of this application.

For example, FIG. 2 is a schematic diagram of a hardware structure of a device according to an embodiment of this application. As shown in FIG. 2, a device 20 includes a processor 201, a memory 202, a transceiver 203, and a plurality of antennas. In this embodiment of this application, descriptions are provided by using an example in which the plurality of antennas include an antenna 204 and an antenna 205. Actually, the device may further include three or more antennas.

The processor 201, the memory 202, and the transceiver 203 are connected by using a communications bus (not shown in the figure).

The processor 201 may be a general-purpose central processing unit (CPU), an application-specific integrated circuit (ASIC), or one or more integrated circuits configured to control execution of the solutions in this application. The processor 201 may be a single-core (single-CPU) processor, or may be a multi-core (multi-CPU) processor. The processor 201 herein may be one or more devices, circuits, and/or processing cores configured to process data (for example, computer program instructions).

The memory 202 may be a read-only memory (ROM) or another type of static storage device that can store static information and instructions, a random-access memory (RAM) or another type of dynamic storage device that can store information and instructions, or may be an electrically erasable programmable ROM (EEPROM), a compact disc (CD) ROM (CD-ROM) or another CD storage, an optical disc storage (including a compact optical disc, a laser disc, an optical disc, a digital versatile disc (DVD), a BLU-RAY disc, and the like), a magnetic disk or another magnetic storage device, or any other medium that can be used to carry or store expected program code in a form of an instruction or a data structure and that can be accessed by a computer. However, the memory 202 is not limited thereto. The memory 202 may exist independently, and is connected to the processor 201 by using the communications bus. Alternatively, the memory 202 may be integrated with the processor 201.

In this embodiment of this application, the memory 202 is configured to store a computer program, and the computer program includes program instructions. The processor 201 is configured to invoke the computer program, and cooperate with the transceiver 203 to implement a time measurement method provided in the following embodiments of this application.

The transceiver 203 is configured to perform a transmitting/receiving action of the device. Optionally, refer to FIG. 2. The transceiver 203 includes a baseband processing circuit 2031 and a radio frequency processing circuit 2032. The baseband processing circuit 2031 includes a signal generation circuit and a signal receiving circuit. The signal generation circuit and the signal receiving circuit may be two independent circuits, or the signal generation circuit and the signal receiving circuit may partially share a same part. The signal generation circuit is configured to generate and transmit a signal. The signal receiving circuit is configured to receive and process a signal. The radio frequency processing circuit 2032 includes a channel (chain) 1 and a channel 2. The channel 1 may be enabled as a transmit channel or a receive channel, and the channel 2 may also be enabled as a transmit channel or a receive channel. In this embodiment of this application, descriptions are provided by using an example in which the channel 1 is enabled as a transmit channel, and the channel 2 is enabled as a receive channel. Optionally, the channel 1 may include a filter, a digital-to-analog converter, a power amplifier, and the like.

The channel 2 may include a filter, an analog-to-digital converter, a power amplifier, and the like. The channel 1 and the channel 2 may be independent of each other, or may share some components.

Refer to FIG. 2. The channel 1 is connected to the signal generation circuit, and the channel 1 is connected to the antenna 204. In other words, the antenna 204 is a transmit antenna. The channel 2 is connected to the signal receiving circuit, and the channel 2 is connected to the antenna 205. In other words, the antenna 205 is a receive antenna. A signal generated by the signal generation circuit in the baseband processing circuit 2031 is transmitted on the channel 1 in the radio frequency processing circuit 2032, and then transmitted externally by using the antenna 204. A signal received by using the antenna 205 is transmitted to the signal receiving circuit in the baseband processing circuit 2031 through the channel 2 in the radio frequency processing circuit 2032, and then the signal is processed by the signal receiving circuit, or is continuously transmitted to the processor 201 for processing.

The baseband processing circuit 2031 is implemented based on hardware. In some implementations, a baseband processing function may alternatively be implemented based on software. For example, the baseband processing function may be implemented by a processor. In other words, a baseband processing module is integrated in the processor. This is not limited in this embodiment of this application. For ease of differentiation, in this application, hardware for implementing the baseband processing function is referred to as the baseband processing circuit, and software for implementing the baseband processing function is referred to as the baseband processing module.

A recording moment at which the device 20 receives or transmits a signal (or a packet) may be collected by the transceiver 203, and may be collected by the baseband processing circuit 2031 or collected by the radio frequency processing circuit 2032, or may be collected at any position between the baseband processing circuit 2031 and the radio frequency processing circuit 2032. For example, the recording moment at which the device 20 transmits the signal may be a moment at which the signal arrives at an egress point of the signal generation circuit in the baseband processing circuit 2031, and may be a moment that is recorded by the signal generation circuit and at which the signal generation circuit transmits the signal. When the baseband processing circuit 2031 is implemented based on hardware, the recording moment is the hardware recording moment. In some embodiments, the baseband processing function may be implemented based on software, and the signal receiving moment and the signal transmitting moment that are recorded by the baseband processing module are the software recording moments. For another example, the recording moment at which the device 20 transmits the signal may alternatively be a moment at which the signal arrives at a component such as the filter on the channel 1 of the radio frequency processing circuit 2032.

Based on the foregoing content, it can be learned that after the device records the signal transmitting moment, the signal continues to be transmitted inside the device until the signal is transmitted at the air interface by using the transmit antenna. In addition, after the device receives a signal at the air interface by using the receive antenna, the signal is transmitted inside the device until the signal reaches a position for recording a receiving moment, and then the device records the signal receiving moment. Therefore, there is a delay between recording moments at which the device transmits a wireless signal and receives a wireless signal and actual moments at which the wireless signal is transmitted and the wireless signal is received at the air interface.

For example, in the implementation scenario shown in FIG. 1, a recording moment at which the device 101 transmits the wireless signal 1 is recorded as T1', a recording moment at which the device 102 receives the wireless signal 1 is recorded as T2', a recording moment at which the device 102 transmits the wireless signal 2 is recorded as T3', and a recording moment at which the device 101 receives the wireless signal 2 is recorded as T4'. In this case, the following formulas are obtained.

T1=T1'+ΔT1$_{TX\_DELAY}$, where ΔT1$_{TX\_DELAY}$ indicates a transmitting delay from the recording moment at which the device 101 transmits the wireless signal 1 to a moment at which the device 101 transmits the wireless signal 1 at the air interface.

T2=T2'—ΔT2$_{RX\_DELAY}$, where ΔT2$_{RX\_DELAY}$ indicates a receiving delay from a moment at which the device 102 receives the wireless signal 1 at the air interface to the recording moment at which the device 102 receives the wireless signal 1.

T3=T3'+ΔT3$_{TX\_DELAY}$, where ΔT3$_{TX\_DELAY}$ indicates a transmitting delay from the recording moment at which the device 102 transmits the wireless signal 2 to a moment at which the device 102 transmits the wireless signal 2 at the air interface.

T4=T4'—ΔT4$_{RX\_DELAY}$, where ΔT4$_{RX\_DELAY}$ indicates a receiving delay from a moment at which the device 101 receives the wireless signal 2 at the air interface to the recording moment at which the device 101 receives the wireless signal 2.

Therefore, an actual RTT between the device 101 and the device 102 meets: RTT=(T4−T1)−(T3−T2)=(T4'−T1')−(ΔT1$_{TX\_DELAY}$+ΔT4$_{RX\_DELAY}$)−(T3'−T2')−(ΔT3$_{TX\_DELAY}$+ΔT2$_{RX\_DELAY}$).

ΔT1$_{TX\_DELAY}$+ΔT4$_{RX\_DELAY}$ is a transceiving delay of the device 101, and ΔT3$_{TX\_DELAY}$+ΔT2$_{RX\_DELAY}$ is a transceiving delay of the device 102.

Because the device has a transceiving delay, there is a large error in a distance between two devices that is directly calculated based on recording moments at which the devices each receive and transmit a wireless signal. A solution is provided in the related technology. First, a transceiving delay of a single antenna in a device is calculated. Then, when measuring an RTT between the device and another device, the device uses a same antenna to transmit a signal and receive a signal, and calculates an actual RTT for the signal at the air interface based on recording moments at which the signal is transmitted and the signal is received and based on the round-trip delay of the antenna used to transmit the signal and receive the signal.

For example, the device includes three antennas: an antenna 01, an antenna 02, and an antenna 03. A process in which the device calculates a transceiving delay of a single antenna in the device is as follows. The device transmits a wireless signal 11 by using the antenna 01, and receives the wireless signal 11 separately by using the antenna 02 and the antenna 03. The device transmits a wireless signal 22 by using the antenna 02, and receives the wireless signal 22 separately by using the antenna 01 and the antenna 03. The device transmits a wireless signal 33 by using the antenna 03, and receives the wireless signal 33 separately by using the antenna 01 and the antenna 02. A delay from a recording moment at which the antenna 01 transmits the wireless signal 11 to a recording moment at which the antenna 02 receives the wireless signal 11 is recorded as δ12. A delay from the recording moment at which the antenna 01 transmits the wireless signal 11 to a recording moment at which the antenna 03 receives the wireless signal 11 is recorded as δ13. A delay from a recording moment at which the antenna 02 transmits the wireless signal 22 to a recording moment at which the antenna 01 receives the wireless signal 22 is recorded as δ21. A delay from the recording moment at which the antenna 02 transmits the wireless signal 22 to a recording moment at which the antenna 03 receives the wireless signal 22 is recorded as δ23. A delay from a recording moment at which the antenna 03 transmits the wireless signal 33 to a recording moment at which the antenna 01 receives the wireless signal 33 is recorded as δ31. A delay from the recording moment at which the antenna 03 transmits the wireless signal 33 to a recording moment at which the antenna 02 receives the wireless signal 33 is recorded as δ32. The following formula may be obtained:

$$T1_T + T12 + T2_R = \delta 12 \quad \text{Formula (1)}$$

$$T1_T + T13 + T3_R = \delta 13 \quad \text{Formula (2)}$$

$$T2_T + T21 + T1_R = \delta 21 \quad \text{Formula (3)}$$

$$T2_T + T23 + T3_R = \delta 23 \quad \text{Formula (4)}$$

$$T3_T + T31 + T1_R = \delta 31 \quad \text{Formula (5)}$$

$$T3_T + T32 + T2_R = \delta 32 \quad \text{Formula (6)}$$

$T1_T$ represents a transmitting delay from a recording moment at which the device transmits a wireless signal to a moment at which the device transmits the wireless signal by using the antenna 01 at an air interface. $T1_R$ represents a receiving delay from a moment at which the device receives a wireless signal by using the antenna 01 at the air interface to a recording moment at which the device receives the wireless signal. $T2_T$ represents a transmitting delay from a recording moment at which the device transmits a wireless signal to a moment at which the device transmits the wireless signal by using the antenna 02 at an air interface. $T2_R$ represents a receiving delay from a moment at which the device receives a wireless signal by using the antenna 02 at the air interface to a recording moment at which the device receives the wireless signal. $T3_T$ represents a transmitting delay from a recording moment at which the device transmits a wireless signal to a moment at which the device transmits the wireless signal by using the antenna 03 at an air interface. $T3_R$ represents a receiving delay from a moment at which the device receives a wireless signal by using the antenna 03 at the air interface to a recording moment at which the device receives the wireless signal. T12 indicates a transmission time of the wireless signal from the antenna 01 to the antenna 02. T13 indicates a transmission time of the wireless signal from the antenna 01 to the antenna 03. T21 indicates a transmission time of the wireless signal from the antenna 02 to the antenna 01. T23 indicates a transmission time of the wireless signal from the antenna 02 to the antenna 03. T31 indicates a transmission time of the wireless signal from the antenna 03 to the antenna 01. T32 indicates a transmission time of the wireless signal from the antenna 03 to the antenna 02.

A distance between two antennas is known, and a transmission speed of the wireless signal is also known. Therefore, a transmission time of the wireless signal between the two antennas is also known. In other words, T12, T13, T21, T23, T31, and T32 are all known constants. Then, according to formula (1) to formula (6), the following may be obtained:

$$T1_T+T2_T+T3_T+T1_R+T2_R+T3_R=\text{constant 1} \quad \text{Formula (7)}$$

Constant $1=[(\delta12+\delta13+\delta21+\delta23+\delta31+\delta32)-(\text{T}\mathbf{12}+\text{T}\mathbf{13}+\text{T}\mathbf{21}+\text{T}\mathbf{23}+\text{T}\mathbf{31}+\text{T}\mathbf{32})]/2$.

In addition, according to formula (4)+formula (6), the following may be obtained:

$$T2_T+T3_T+T2_R+T3_R=\text{constant 2} \quad \text{Formula (8)}$$

Constant $2=(\delta23+\delta32)-(\text{T}\mathbf{23}+\text{T}\mathbf{32})$.

Further, according to formula (7) to formula (8), the following may be obtained:

$$T1_T+T1_R=\text{constant 3} \quad \text{Formula (9)}$$

Constant 3=constant 1−constant 2. Constant 3 is a transceiving delay of the antenna 01. For a manner of calculating transceiving delays of the antenna 02 and the antenna 03, refer to a manner of calculating the transceiving delay of the antenna 01. Details are not described again in this embodiment of this application.

Based on the foregoing calculation process, it can be learned that, in the related technology, the device needs to transmit and receive wireless signals for a plurality of times when calculating a transceiving delay of a single antenna, and calculation steps are complex. Therefore, an entire calculation process is relatively complex, and a time for calculating the transceiving delay of the single antenna is relatively long. Some components inside the device may have a plurality of working levels. For example, a power amplifier in a radio frequency processing circuit usually has a plurality of working levels. Some components working at different levels may have different degrees of impact on a signal transceiving delay. However, actually, the plurality of components in the device have many different combinations of the plurality of levels. Therefore, a large quantity of calculation resources and a lot of calculation time are consumed by using the calculation manner provided in the related technology to calculate a transceiving delay of an antenna in the device in each level combination. When a working level of a component in the device changes, the device cannot perform quick online calibration of a transceiving delay of an antenna. In addition, if the device has only two antennas, the device cannot calculate a transceiving delay of a single antenna by using the foregoing calculation process.

When a device calculates an RTT between the device and another device, a calculation error is mainly resulted from a transmitting delay from a recording moment at which the device transmits a wireless signal to a moment at which the device transmits the wireless signal at an air interface by using an antenna, and a receiving delay from a moment at which the device receives a wireless signal at the air interface to a recording moment at which the device receives the wireless signal. The calculation error is unrelated to whether an antenna used by the device to transmit a packet is the same as an antenna used by the device to receive a packet. The transceiving delay of the single antenna is used as an absolute delay, a calculation process of the transceiving delay of the single antenna is relatively complex, and a calculation manner provided in the related technology cannot implement calculation of an absolute transceiving delay of a single antenna in a device having two antennas. Therefore, the embodiments of this application provide a time measurement method for calculating an RTT between a device and another device by calculating a relative transceiving delay from one antenna in the device to another antenna in the device. First, the device measures a delay in receiving, by the device by using one antenna (or a receive antenna), a wireless signal transmitted by another antenna (or a transmit antenna) in the device, and uses the delay as a calibration delay from the transmit antenna to the receive antenna. Then, the device transmits a packet to the other device by using the transmit antenna, and receives a packet from the other device by using the receive antenna. When calculating the RTT between the device and the other device, the device may calibrate, based on the calibration delay from the transmit antenna to the receive antenna, a recording moment at which the device transmits a packet and a recording moment at which the device receives a packet. In this way, accuracy of the calculated RTT is improved, and an error in a distance calculated between the devices is reduced, that is, accuracy of measuring the distance between the devices is improved. In addition, the time measurement method is applicable to a device having two or more antennas, and therefore has a wide application range.

Optionally, the device transmits a calibration signal by using one antenna in the device, and receives the calibration signal by using another antenna in the device. Then, the device measures a delay for the calibration signal, and records the delay for the calibration signal as a calibration delay from the antenna for transmitting the calibration signal to the antenna for receiving the calibration signal. The calibration signal may be a complete packet. Alternatively, the calibration signal may include only one or more sequences (that is, include only a preamble part of a packet). For example, one or more Zadoff-Chu sequences (that is, ZC sequences) may be used as the calibration signal. A manner of measuring the calibration delay from the transmit antenna to the receive antenna in the device is relatively simple, and a calculation time consumed by the device is also relatively short. Therefore, in this embodiment of this application, fast calibration of the transceiving delay of the device can be implemented, and an online calibration requirement is meet.

In this embodiment of this application, the device may further transmit the calibration signal by using one antenna for a plurality of times, and receive, by using another antenna for a plurality of times, the calibration signal transmitted by using the antenna. Then, the device uses an average value of delays obtained through measurement for the calibration signal for a plurality of times as the calibration delay from the antenna for transmitting the calibration signal to the antenna for receiving the calibration signal, to reduce an error of the calibration delay obtained through measurement.

Optionally, when the device receives a calibration instruction, the device measures calibration delays between a plurality of antennas in the device. The calibration instruction may come from a controller connected to the device, a server connected to the device, or the device. For example, if the device is an AP, the calibration instruction may be transmitted by a radio controller to the AP. Alternatively, when a temperature change of an environment in which the device is located exceeds a threshold, and/or a working level of a component in the device changes, the device may determine that the device receives the calibration instruction. Alternatively, when the device starts to use a positioning service or a distance measurement service, the device may determine that the device receives the calibration instruction.

Optionally, the device may record a plurality of groups of correspondences between calibration delays and transmit and receive antennas. For example, the device includes an antenna 1 and an antenna 2, and a correspondence recorded in the device may be shown in Table 1.

TABLE 1

| Transmit antenna | Receive antenna | Calibration delay |
|---|---|---|
| Antenna 1 | Antenna 2 | $\Delta T12$ |
| Antenna 2 | Antenna 1 | $\Delta T21$ |
| ... | ... | ... |

Refer to Table 1. The device may record a calibration delay $\Delta T12$ corresponding to transmit and receive antennas, where the transmit antenna is the antenna 1 and the receive antenna is the antenna 2, and the device may record a calibration delay $\Delta T21$ corresponding to transmit and receive antennas, where the transmit antenna is the antenna 2 and the receive antenna is the antenna 1. When calculating the RTT between the device and the other device, the device may select a corresponding calibration delay from a correspondence based on actual transmit and receive antennas.

Because delays in transmitting and receiving a packet by the device may also be affected by a temperature and a working level of a component in the device, when recording a correspondence between a calibration delay and transmit and receive antennas, the device may further record a temperature and/or a working level of the component during measurement. When calculating the RTT between the device and the other device, the device may select a corresponding calibration delay from a correspondence based on actual transmit and receive antennas in combination with a temperature of an environment in which the device is located and/or a working level of a component in the device.

The time measurement method provided in this embodiment of this application may be applied to a device having two or more antennas. The device may be used as a measurement initiating end or a measurement responding end. In this application, the following two embodiments are used to respectively describe implementation processes of a time measurement method provided in this application. In the implementation processes, a first device having a plurality of antennas is used as a measurement initiating end or a measurement responding end.

Figure 3:
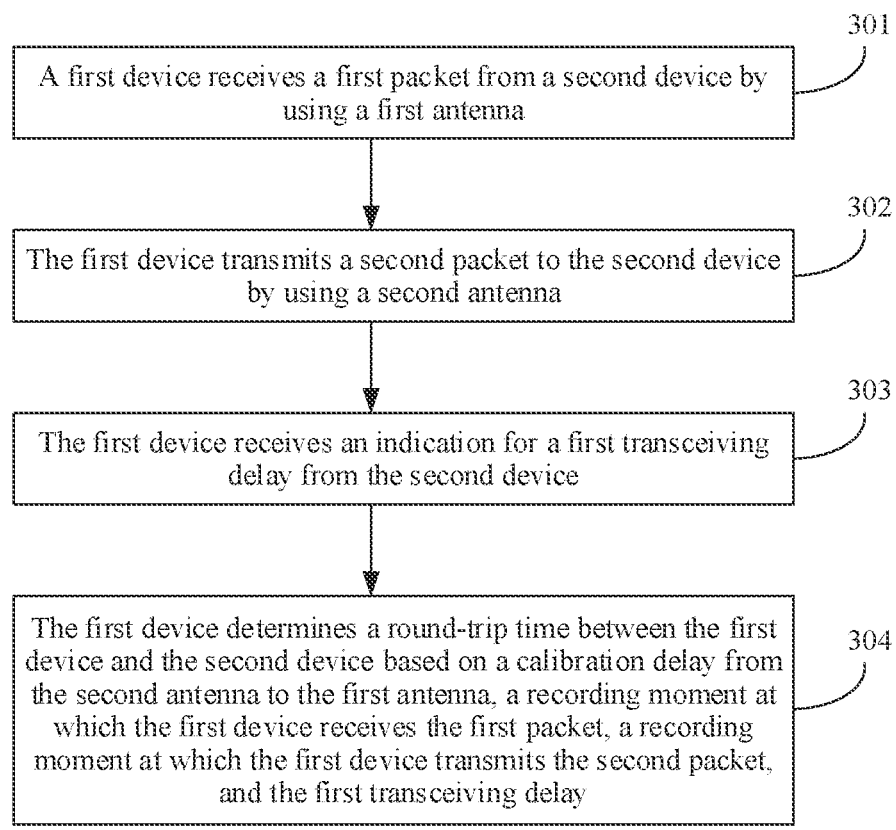
FIG. 3 is a schematic flowchart of a time measurement method according to an embodiment of this application.

In a first embodiment of this application, the first device is the measurement initiating end. FIG. 3 is a schematic flowchart of a time measurement method according to an embodiment of this application. As shown in FIG. 3, the method includes the following steps.

Step 301: A first device receives a first packet from a second device by using a first antenna.

In actual application, a plurality of antennas in the first device may receive the first packet from the second device. That the first device receives the first packet from the second device by using the first antenna may be understood as following. The first device processes only the first packet that is received by using the first antenna from the second device, but does not process the first packet that is received by using another antenna from the second device.

Step 302: The first device transmits a second packet to the second device by using a second antenna.

Optionally, the second packet is a response packet of the first packet.

The first antenna and the second antenna are different antennas in the first device. Optionally, a quantity of antennas in the first device is greater than 2, and the first antenna and the second antenna are two antennas that correspond to the second device and that have maximum received signal strength in the plurality of antennas in the first device. Optionally, before receiving the first packet from the second device by using the first antenna, that is, before performing step 301, the first device may separately receive the packet from the second device by using the plurality of antennas, measure received signal strength corresponding to each antenna, and record two antennas with the highest received signal strength as a transmit antenna and a receive antenna corresponding to the second device respectively.

In this embodiment of this application, if the quantity of antennas in the first device is greater than 2, the first device may select, based on the received signal strength of the plurality of antennas in the first device for the second device, an antenna used to transmit a packet to the second device and an antenna used to receive a packet from the second device. For example, the first device may select, from the plurality of antennas, an antenna with the highest received signal strength corresponding to the second device to transmit the packet to the second device, and select, from the plurality of antennas, an antenna with second highest received signal strength corresponding to the second device to receive the packet from the second device.

Alternatively, the first device may transmit a packet to another device by using one fixed antenna, and receive a packet from the other device by using another fixed antenna.

Currently, a multi-antenna device usually replies a packet to another device by using an antenna through which the multi-antenna device receives a packet from the other device, and does not specify one fixed antenna for transmitting a packet to a device and another fixed antenna for receiving a packet from the device. In this application, before receiving the first packet from the second device (step 301) and transmitting the second packet to the second device (step 302), the first device first determines an antenna that is in the first device and that is used to receive the packet from the second device and an antenna that is in the first device and that is used to transmit the packet to the second device, so as to obtain a calibration delay from the transmit antenna to the receive antenna.

In this embodiment of this application, after determining to use the first antenna to receive the packet from the second device and use the second antenna to transmit the packet to the second device, the first device obtains a calibration delay from the second antenna to the first antenna. The calibration delay from the second antenna to the first antenna is a delay in receiving, by the first device by using the first antenna, a wireless signal transmitted by the second antenna. The calibration delay from the second antenna to the first antenna may be obtained by the first device through measurement.

Optionally, a process in which the first device measures the calibration delay from the second antenna to the first antenna includes the following. The first device transmits a calibration signal by using the second antenna. The first device receives the calibration signal by using the first antenna. The first device measures a delay for the calibration signal, and records the delay for the calibration signal as the calibration delay from the second antenna to the first antenna. The delay for the calibration signal is obtained based on a recording moment at which the second antenna transmits the calibration signal and a recording moment at which the first antenna receives the calibration signal.

Optionally, $\Delta T1 = t2 - t1$. $\Delta T1$ is the delay for the calibration signal, $t1$ is a recording moment at which the second antenna transmits the calibration signal, and $t2$ is a recording moment at which the first antenna receives the calibration signal.

The delay for the calibration signal calculated in this embodiment of this application includes an air interface delay in transmitting the calibration signal from the second antenna to the first antenna. On one hand, a distance between the first antenna and the second antenna is usually small, and the air interface delay from the second antenna to the first antenna is also small. The air interface delay has little impact on a calculation result of the calibration delay from the second antenna to the first antenna. Therefore, the air interface delay from the second antenna to the first antenna may be ignored. On the other hand, when calculating the calibration delay from the second antenna to the first antenna, the first device usually cannot learn of a relative position between the second device and the first device. Therefore, when calculating the calibration delay from the second antenna to the first antenna in this embodiment of this application, the air interface delay from the second antenna to the first antenna is usually not considered. In this embodiment of this application, when the first device can learn of the relative position between the second device and the first device, impact of the air interface delay from the second antenna to the first antenna on calculation of an RTT between the first device and the second device may also be considered, to adjust the delay for the calibration signal and obtain the calibration delay.

Figure 4:
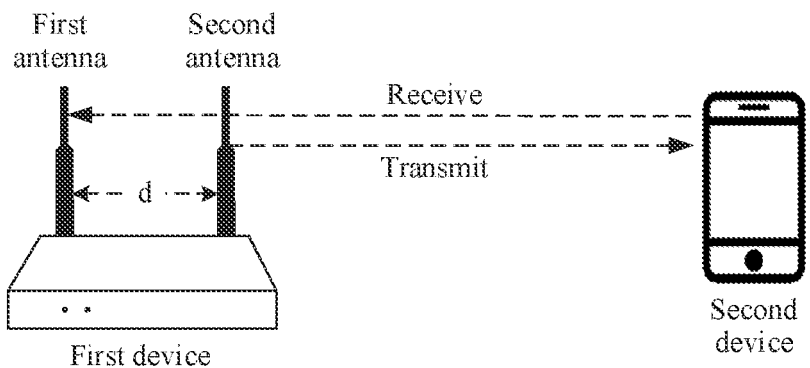
FIG. 4 is a schematic diagram of a relative position between a first device and a second device according to an embodiment of this application.

For example, FIG. 4 is a schematic diagram of a relative position between a first device and a second device according to an embodiment of this application. As shown in FIG. 4, a distance between a first antenna and a second antenna is d, the second device, the first antenna in the first device, and the second antenna in the first device are located in a straight line, and the first antenna is located on a side that is of the second antenna and that is away from the second device. If the first device uses a midpoint of a connection line between the first antenna and the second antenna as a position of the first device, when calculating the RTT between the first device and the second device, the first device may use $\Delta T1$ as the calibration delay. If the first device uses a position of the first antenna as the position of the first device, when calculating the RTT between the first device and the second device, the first device may use $(\Delta T1-d/c)$ as the calibration delay. If the first device uses a position of the second antenna as the position of the first device, when calculating the RTT between the first device and the second device, the first device may use $(\Delta T1+d/c)$ as the calibration delay.

Optionally, the first device records a plurality of groups of correspondences between calibration delays and transmit and receive antennas. After the first device determines to use the first antenna to receive the packet from the second device, and use the second antenna to transmit the packet to the second device, in response to a correspondence that is recorded in the first device and that is between a target calibration delay and transmit and receive antennas in a case in which the transmit antenna is the second antenna and the receive antenna is the first antenna, the first device uses the target calibration delay as a calibration delay from the second antenna to the first antenna. Alternatively, if the first device does not record the calibration delay corresponding to the transmit and receive antennas that are respectively the second antenna and the first antenna, the first device performs the foregoing measurement process to measure the calibration delay from the second antenna to the first antenna.

Step 303: The first device receives an indication for a first transceiving delay from the second device.

The first transceiving delay is a delay from a time at which the second device transmits the first packet to a time at which the second device receives the second packet. Optionally, the indication for the first transceiving delay is a value of the first transceiving delay. Alternatively, the indication for the first transceiving delay includes a transmitting timestamp at which the second device transmits the first packet and a receiving timestamp at which the second device receives the second packet. The first device calculates the value of the first transceiving delay based on the transmitting timestamp at which the second device transmits the first packet and the receiving timestamp at which the second device receives the second packet.

Optionally, the first device may receive the indication for the first transceiving delay from the second device by using any antenna. Alternatively, if the first device and the second device are connected by using a wired medium, the first device may receive the indication for the first transceiving delay from the second device by using the wired medium. For example, if both the first device and the second device are APs, and the first device and the second device are connected by using a radio controller in a wired manner, the first device may receive the indication for the first transceiving delay that is from the second device and that is forwarded by the controller. A manner in which the first device receives the indication for the first transceiving delay from the second device is not limited in this embodiment of this application.

Step 304: The first device determines the RTT between the first device and the second device based on the calibration delay from the second antenna to the first antenna, a recording moment at which the first device receives the first packet, a recording moment at which the first device transmits the second packet, and the first transceiving delay.

An implementation process of step 304 includes the following. The first device calibrates, based on the calibration delay from the second antenna to the first antenna, a delay from the recording moment at which the first device receives the first packet to the recording moment at which the first device transmits the second packet, to obtain a target transceiving delay. Then, the first device calculates the RTT between the first device and the second device based on the target transceiving delay and the first transceiving delay.

Optionally, $RTT=\Delta T2-(t4-t3)-\Delta T1$. RTT is the RTT between the first device and the second device. $\Delta T1$ is the calibration delay from the second antenna to the first antenna. t3 is the recording moment at which the first device receives the first packet, and t4 is the recording moment at which the first device transmits the second packet. A sum of (t4−t3) and $\Delta T1$ is the target transceiving delay. $\Delta T2$ is the first transceiving delay.

Optionally, a process of measuring the RTT between the first device and the second device may be implemented according to an FTM protocol. For example, in a WLAN, the first packet may be an FTM frame, and the second packet may be an acknowledgment (ACK) frame. Before performing step 301, the first device first transmits an FTM request frame to the second device, where the FTM request frame is used to request to measure the RTT between the first device and the second device. In other words, the first device, as a measurement initiating end, initiates a time measurement process by using the FTM request frame.

According to the FTM protocol, the indication for the first transceiving delay that is received by the first device from the second device in step 303 may be carried in the FTM frame. The indication for the first transceiving delay may include the transmitting timestamp at which the second device transmits the first packet and the receiving timestamp at which the second device receives the second packet. The transmitting timestamp at which the second device transmits the first packet is included in a time of departure (TOD) field of the FTM frame, and the receiving timestamp at which the second device receives the second packet is included in a time of arrival (TOA) field of the FTM frame.

In the time measurement method provided in this embodiment of this application, the first device is used as the measurement initiating end, and after determining to use the first antenna to receive the packet from the second device and use the second antenna to transmit the packet to the second device, the first device obtains the calibration delay from the second antenna to the first antenna. In a time measurement process, the first device receives the first packet from the second device by using the first antenna, and transmits the second packet to the second device by using the second antenna. After receiving the indication for the first transceiving delay from the second device, the first device calibrates, based on the calibration delay from the second antenna to the first antenna, the delay from the recording moment at which the first device receives the first packet to the recording moment at which the first device transmits the second packet, and determines the RTT between the first device and the second device based on a calibrated delay and the first transceiving delay. Because the first device performs delay calibration on the recording moment at which the packet is received and the recording moment at which the packet is transmitted, accuracy of the calculated RTT can be improved, and an error in a distance calculated between the devices is reduced, that is, accuracy of measuring the distance between the devices is improved.

Figure 5:
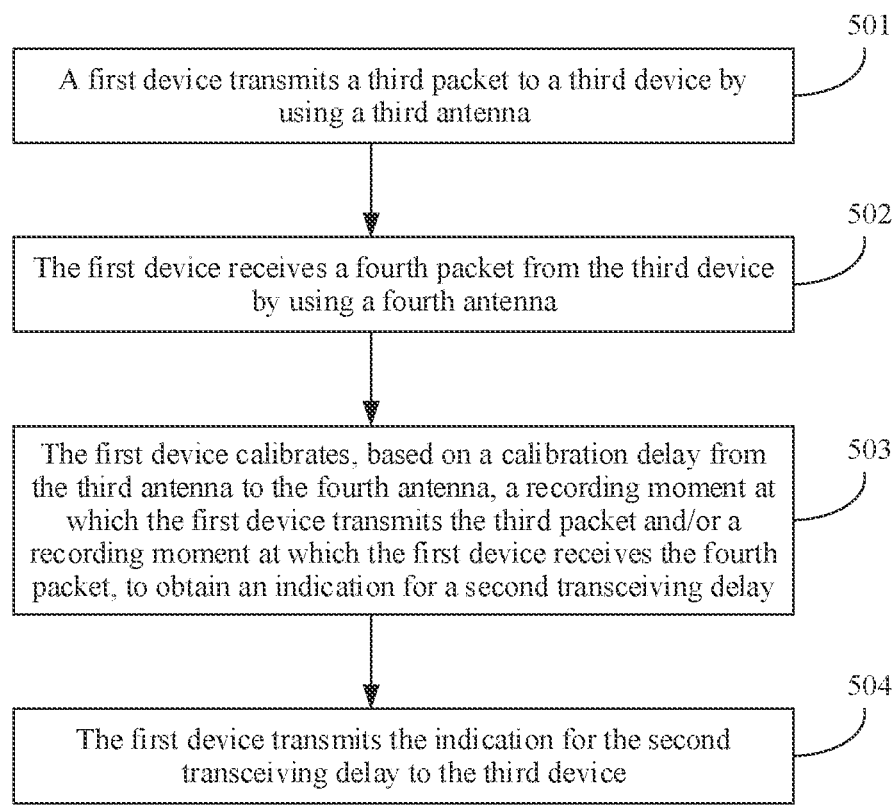
FIG. 5 is a schematic flowchart of another time measurement method according to an embodiment of this application.

In a second embodiment of this application, the first device is the measurement responding end. FIG. 5 is a schematic flowchart of another time measurement method according to an embodiment of this application. As shown in FIG. 5, the method includes the following steps.

Step 501: A first device transmits a third packet to a third device by using a third antenna.

As a measurement responding end, the first device first determines an antenna that is in the first device and that is used to receive a packet from the third device and an antenna that is used to transmit a packet to the third device, so as to obtain a calibration delay from a transmit antenna to a receive antenna. For a manner in which the first device determines the transmit antenna and the receive antenna corresponding to the third device, refer to a related description process in which the first device determines the transmit antenna and the receive antenna corresponding to the second device in step 302. Details are not described again in this embodiment of this application.

In this embodiment of this application, after determining to use the third antenna to transmit the packet to the third device and use the fourth antenna to receive the packet from the third device, the first device obtains a calibration delay from the third antenna to the fourth antenna. The calibration delay from the third antenna to the fourth antenna is a delay in receiving, by the first device by using the fourth antenna, a wireless signal transmitted by the third antenna. For a manner in which the first device obtains the calibration delay from the third antenna to the fourth antenna, refer to a related description process in which the first device obtains the calibration delay from the second antenna to the first antenna in step 302. Details are not described again in this embodiment of this application. The third antenna and the fourth antenna are different antennas in the first device.

Optionally, the third antenna and the second antenna may be a same antenna in the first device, and the fourth antenna and the first antenna may be a same antenna in the first device.

Step 502: The first device receives a fourth packet from the third device by using the fourth antenna.

Optionally, the fourth packet is a response packet of the third packet. In actual application, a plurality of antennas in the first device may receive the fourth packet from the third device. That the first device receives the fourth packet from the third device by using the fourth antenna may be understood as following. The first device processes only the fourth packet that is received by using the fourth antenna from the third device, but does not process the fourth packet that is received by using another antenna from the third device.

Step 503: The first device calibrates, based on the calibration delay from the third antenna to the fourth antenna, a recording moment at which the first device transmits the third packet and/or a recording moment at which the first device receives the fourth packet, to obtain an indication for a second transceiving delay.

The second transceiving delay is a delay from a time at which the first device transmits the third packet to a time at which the first device receives the fourth packet. Optionally, ΔT4=t6−t5−ΔT3. ΔT4 is the second transceiving delay, t5 is the recording moment at which the first device transmits the third packet, t6 is the recording moment at which the first device receives the fourth packet, and ΔT3 is the calibration delay from the third antenna to the fourth antenna.

Optionally, the indication for the second transceiving delay is a value of the second transceiving delay. In other words, the first device may use ΔT4 as the indication for the second transceiving delay. Alternatively, the indication for the second transceiving delay includes a transmitting timestamp at which the first device transmits the third packet and a receiving timestamp at which the first device receives the fourth packet. The transmitting timestamp at which the first device transmits the third packet is obtained by calibrating, based on the calibration delay from the third antenna to the fourth antenna, the recording moment at which the first device transmits the third packet, and/or the receiving timestamp at which the first device receives the fourth packet is obtained by calibrating, based on the calibration delay from the third antenna to the fourth antenna, the recording moment at which the first device receives the fourth packet. For example, only the recording moment at which the first device receives the fourth packet may be calibrated. In this case, the transmitting timestamp at which the first device transmits the third packet is t5, and the receiving timestamp at which the first device receives the fourth packet is (t6−ΔT3). Alternatively, only the recording moment at which the first device transmits the third packet may be calibrated. In this case, the transmitting timestamp at which the first device transmits the third packet is (t5+ΔT3), and the receiving timestamp at which the first device receives the fourth packet is t6. Alternatively, the recording moment at which the first device receives the fourth packet and the recording moment at which the first device transmits the third packet may be simultaneously calibrated. For example, the transmitting timestamp at which the first device transmits the third packet is (t5+(ΔT3)/2), and the receiving timestamp at which the first device receives the fourth packet is (t6−(ΔT3)/2).

Step 504: The first device transmits the indication for the second transceiving delay to the third device.

The indication for the second transceiving delay is used by the third device to determine an RTT between the third device and the first device.

Optionally, the first device may transmit the indication for the second transceiving delay to the third device by using any antenna. Alternatively, if the first device and the third device are connected by using a wired medium, the first device may transmit the indication for the second transceiving delay to the third device by using the wired medium. For example, if both the first device and the third device are APs, and the first device and the third device are connected by using a radio controller in a wired manner, the first device may transmit the indication for the second transceiving delay to the third device by using the controller. A manner in which the first device transmits the indication for the second transceiving delay to the third device is not limited in this embodiment of this application.

Optionally, a process of measuring the RTT between the first device and the third device may be implemented according to an FTM protocol. For example, in a WLAN, the third packet may be an FTM frame, and the fourth packet may be an ACK frame. Before performing step 501, the first device first receives an FTM request frame from the third device, where the FTM request frame is used to request to measure the RTT between the third device and the first device. Then, the first device transmits the third packet to the third device based on the FTM request frame by using the third antenna. In other words, the first device, as the measurement responding end, starts to perform a time measurement process after receiving the FTM request frame from the third device.

According to the FTM protocol, the indication for the second transceiving delay that is transmitted by the first device to the third device in step 504 may be carried in the FTM frame. The indication for the second transceiving delay may include the transmitting timestamp at which the first device transmits the third packet and the receiving timestamp at which the first device receives the fourth packet. The transmitting timestamp at which the first device transmits the third packet is included in a TOD field of the FTM frame, and the receiving timestamp at which the first device receives the fourth packet is included in a TOA field of the FTM frame.

In the time measurement method provided in this embodiment of this application, the first device serves as the measurement responding end, and after determining to use the third antenna to transmit the packet to the third device and to use the fourth antenna to receive the packet from the third device, the first device obtains the calibration delay from the third antenna to the fourth antenna. In the time measurement process, the first device transmits the third packet to the third device by using the third antenna, and receives the fourth packet from the third device by using the fourth antenna. Then, the first device calibrates, based on the calibration delay from the third antenna to the fourth antenna, the recording moment at which the first device transmits the third packet and/or the recording moment at which the first device receives the fourth packet, to obtain the indication for the second transceiving delay, and transmits the indication for the second transceiving delay to the third device. Because the second transceiving delay is a delay obtained after the first device calibrates the recording moment at which the packet is transmitted and the recording moment at which the packet is received, when the third device determines the RTT between the third device and the first device by using the second transceiving delay, accuracy of the calculated RTT can be improved, and an error in a distance calculated between the devices is reduced, that is, accuracy of measuring the distance between the devices is improved.

Figure 6:
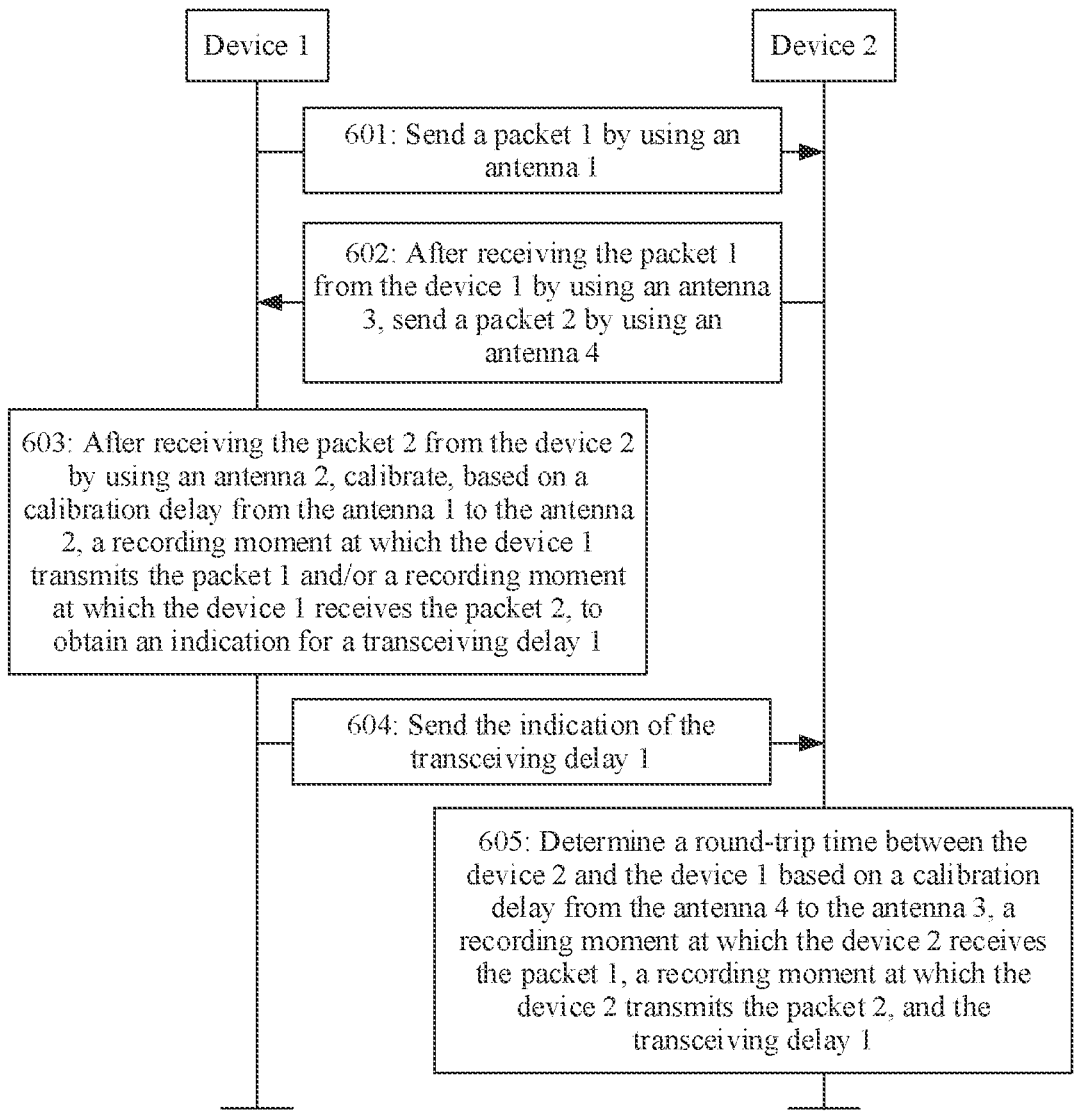
FIG. 6 is a schematic flowchart of still another time measurement method according to an embodiment of this application.

In this embodiment of this application, the measurement initiating end can apply the time measurement method shown in FIG. 3, and/or the measurement responding end can apply the time measurement method shown in FIG. 5. In the following embodiment of this application, an interaction process between a measurement initiating end and a measurement responding end is described by using an example in which both the measurement initiating end and the measurement responding end support the time measurement method provided in the embodiments of this application. The measurement initiating end is a device 1, including an antenna 1 and an antenna 2. The measurement responding end is a device 2, including an antenna 3 and an antenna 4. For example, FIG. 6 is a schematic flowchart of still another time measurement method according to an embodiment of this application. As shown in FIG. 6, the method includes the following steps.

Step 601: A device 1 transmits a packet 1 to a device 2 by using an antenna 1.

For an implementation process of this step, refer to step 501. Details are not described again in this embodiment of this application.

Step 602: After receiving the packet 1 from the device 1 by using an antenna 3, the device 2 transmits a packet 2 to the device 1 by using an antenna 4.

For an implementation process of this step, refer to step 301 to step 302. Details are not described again in this embodiment of this application.

Step 603: After receiving the packet 2 from the device 2 by using an antenna 2, the device 1 calibrates, based on a calibration delay from the antenna 1 to the antenna 2, a recording moment at which the device 1 transmits the packet 1 and/or a recording moment at which the device 1 receives the packet 2, so as to obtain an indication of a transceiving delay 1.

For an implementation process of this step, refer to step 502 to step 503. Details are not described again in this embodiment of this application.

Step 604: The device 1 transmits the indication of the transceiving delay 1 to the device 2.

For an implementation process of this step, refer to step 504. Details are not described again in this embodiment of this application.

Step 605: The device 2 determines an RTT between the device 2 and the device 1 based on a calibration delay from the antenna 4 to the antenna 3, a recording moment at which the device 2 receives the packet 1, a recording moment at which the device 2 transmits the packet 2, and the transceiving delay 1.

For an implementation process of this step, refer to step 304. Details are not described again in this embodiment of this application.

In conclusion, in the time measurement method provided in this embodiment of this application, a delay in receiving, by a device by using one antenna (or a receive antenna), a wireless signal transmitted by another antenna (or a transmit antenna) of the device is used as a calibration delay from the transmit antenna to the receive antenna. Then, the device transmits a packet to another device by using the transmit antenna, and receives a packet from the other device by using the receive antenna. When calculating an RTT between the device and the other device or in response to a fact that the other device calculates the RTT between the device and the other device, the device may calibrate, based on the calibration delay from the transmit antenna to the receive antenna, a recording moment at which the device transmits a packet and a recording moment at which the device receives a packet. In this way, accuracy of the calculated RTT is improved, and an error in a distance calculated between the devices is reduced, that is, accuracy of measuring the distance between the devices is improved. In addition, the time measurement method can be applied to a device having two or more antennas. Therefore, the time measurement method provided in the embodiments of this application has a relatively wide application scope.

Figure 7:
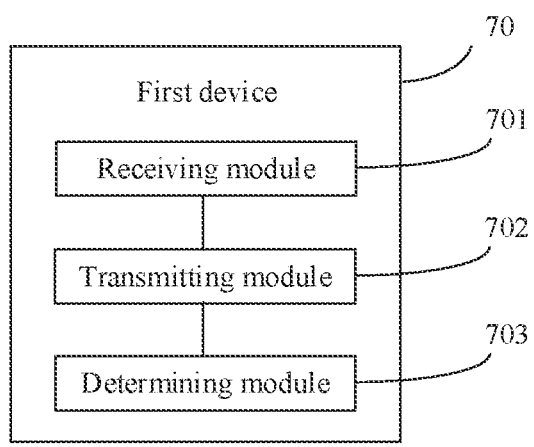
FIG. 7 is a schematic diagram of a structure of a first device according to an embodiment of this application.

FIG. 7 is a schematic diagram of a structure of a first device according to an embodiment of this application. As shown in FIG. 7, the first device 70 includes a receiving module 701, a transmitting module 702, and a determining module 703.

The receiving module 701 is configured to receive a first packet from a second device by using a first antenna. The transmitting module 702 is configured to transmit a second packet to the second device by using a second antenna, where the first antenna and the second antenna are different antennas in the first device. The receiving module 701 is further configured to receive an indication for a first transceiving delay from the second device, where the first transceiving delay is a delay from a time at which the second device transmits the first packet to a time at which the second device receives the second packet. The determining module 703 is configured to determine an RTT between the first device and the second device based on a calibration delay from the second antenna to the first antenna, a recording moment at which the first device receives the first packet, a recording moment at which the first device transmits the second packet, and the first transceiving delay. The calibration delay from the second antenna to the first antenna is a delay in receiving, by the first device by using the first antenna, a wireless signal transmitted by the second antenna.

Optionally, the indication for the first transceiving delay is a value of the first transceiving delay. Alternatively, the indication for the first transceiving delay includes a transmitting timestamp at which the second device transmits the first packet and a receiving timestamp at which the second device receives the second packet.

Figure 8:
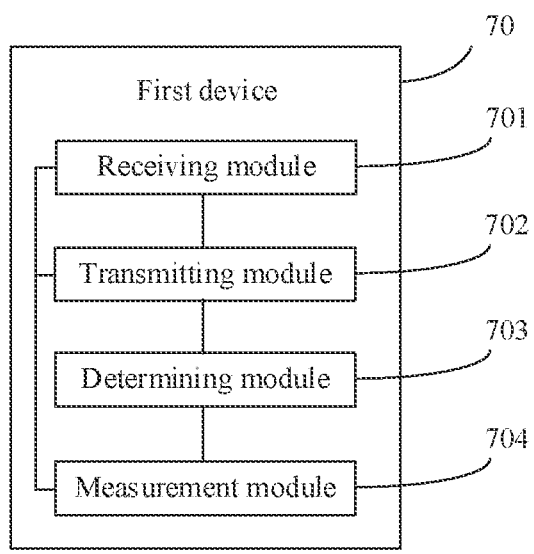
FIG. 8 is a schematic diagram of a structure of another first device according to an embodiment of this application.

Optionally, as shown in FIG. 8, the first device 70 further includes a measurement module 704. The transmitting module 702 is further configured to transmit a calibration signal by using the second antenna. The receiving module 701 is further configured to receive the calibration signal by using the first antenna. The measurement module 704 is configured to measure a delay for the calibration signal, and record the delay for the calibration signal as the calibration delay from the second antenna to the first antenna.

Optionally, $\Delta T1 = t2 - t1$. $\Delta T1$ is the delay for the calibration signal, t1 is a recording moment at which the second antenna transmits the calibration signal, and t2 is a recording moment at which the first antenna receives the calibration signal.

Optionally, $RTT = \Delta T2 - (t4 - t3) - \Delta T1$. RTT is the RTT between the first device and the second device, $\Delta T1$ is the calibration delay from the second antenna to the first antenna, t3 is the recording moment at which the first device receives the first packet, t4 is the recording moment at which the first device transmits the second packet, and $\Delta T2$ is the first transceiving delay.

Optionally, a quantity of antennas in the first device is greater than 2, and the first antenna and the second antenna are two antennas that correspond to the second device and that have maximum received signal strength in a plurality of antennas in the first device.

Optionally, the first device records a plurality of groups of correspondences between calibration delays and transmit and receive antennas. The determining module 703 is further configured to, in response to a correspondence that is recorded in the first device and that is between a target calibration delay and transmit and receive antennas, use the target calibration delay as the calibration delay from the second antenna to the first antenna, where the transmit antenna is the second antenna and the receive antenna is the first antenna.

Optionally, the first packet is an FTM frame, and the second packet is an acknowledgment frame.

Figure 9:
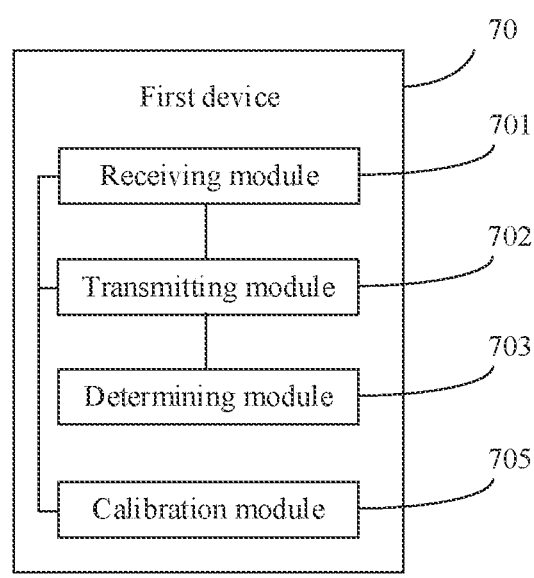
FIG. 9 is a schematic diagram of a structure of still another first device according to an embodiment of this application.

Optionally, as shown in FIG. 9, the first device 70 further includes a calibration module 705. The transmitting module 702 is further configured to transmit a third packet to a third device by using a third antenna. The receiving module 701 is further configured to receive a fourth packet from the third device by using a fourth antenna, where the third antenna and the fourth antenna are different antennas in the first device. The calibration module 705 is configured to calibrate, based on a calibration delay from the third antenna to the fourth antenna, a recording moment at which the first device transmits the third packet and/or a recording moment at which the first device receives the fourth packet, to obtain an indication for a second transceiving delay, where the second transceiving delay is a delay from a time at which the first device transmits the third packet to a time at which the first device receives the fourth packet, and the calibration delay from the third antenna to the fourth antenna is a delay in receiving, by the first device by using the fourth antenna, a wireless signal transmitted by the third antenna. The transmitting module 702 is further configured to transmit the indication for the second transceiving delay to the third device.

Optionally, the indication for the second transceiving delay is a value of the second transceiving delay. Alternatively, the indication for the second transceiving delay includes a transmitting timestamp at which the first device transmits the third packet and a receiving timestamp at which the first device receives the fourth packet. The transmitting timestamp at which the first device transmits the third packet is obtained by calibrating, based on the calibration delay from the third antenna to the fourth antenna, the recording moment at which the first device transmits the third packet, and/or the receiving timestamp at which the first device receives the fourth packet is obtained by calibrating, based on the calibration delay from the third antenna to the fourth antenna, the recording moment at which the first device receives the fourth packet.

Optionally, $\Delta T4 = t6 - t5 - \Delta T3$. $\Delta T4$ is the second transceiving delay, t5 is the recording moment at which the first device transmits the third packet, t6 is the recording moment at which the first device receives the fourth packet, and $\Delta T3$ is the calibration delay from the third antenna to the fourth antenna.

For the apparatus in the foregoing embodiment, specific manners of executing operations by each module are described in detail in the embodiments related to the method. Details are not described herein.

In an optional embodiment of this application, a first device is provided, including a transceiver and a plurality of antennas.

The transceiver is configured to receive a first packet from a second device by using a first antenna in the plurality of antennas, and transmit a second packet to the second device by using a second antenna in the plurality of antennas, where the first antenna and the second antenna are different antennas in the plurality of antennas.

The transceiver is further configured to receive an indication for a first transceiving delay from the second device, where the first transceiving delay is a delay from a time at which the second device transmits the first packet to a time at which the second device receives the second packet.

The transceiver is further configured to determine an RTT between the first device and the second device based on a calibration delay from the second antenna to the first antenna, a recording moment at which the first device receives the first packet, a recording moment at which the first device transmits the second packet, and the first transceiving delay, where the calibration delay from the second antenna to the first antenna is a delay in receiving, by the first device by using the first antenna, a wireless signal transmitted by the second antenna.

Optionally, the transceiver is further configured to transmit a third packet to a third device by using a third antenna, and receive a fourth packet from the third device by using a fourth antenna. The third antenna and the fourth antenna are different antennas in the first device, the third antenna and the foregoing second antenna may be a same antenna, and the fourth antenna and the foregoing first antenna may be a same antenna. The transceiver is further configured to calibrate, based on a calibration delay from the third antenna to the fourth antenna, a recording moment at which the first device transmits the third packet and/or a recording moment at which the first device receives the fourth packet, to obtain an indication for a second transceiving delay, and the second transceiving delay is a delay from a time at which the first device transmits the third packet to a time at which the first device receives the fourth packet. The calibration delay from the third antenna to the fourth antenna is a delay in receiving, by the first device by using the fourth antenna, a wireless signal transmitted by the third antenna. The transceiver is further configured to transmit the indication for the second transceiving delay to the third device.

Optionally, the first device further includes a processor and a memory. The processor is configured to invoke a computer program stored in the memory, to control the transceiver to transmit a calibration signal by using the second antenna and receive the calibration signal by using the first antenna. The processor is further configured to measure a delay for the calibration signal, and record the delay for the calibration signal in the memory as the calibration delay from the second antenna to the first antenna.

Optionally, the memory is configured to store a plurality of groups of correspondences between calibration delays and transmit and receive antennas. The transceiver is configured to obtain, from the memory, a calibration delay corresponding to transmit and receive antennas, where the transmit antenna is the second antenna and the receive antenna is the first antenna, and use the calibration delay as the calibration delay from the second antenna to the first antenna.

In another optional embodiment of this application, another first device is provided, including a processor, a memory, a transceiver, and a plurality of antennas.

The transceiver is configured to receive a first packet from a second device by using a first antenna in the plurality of antennas, and transmit a second packet to the second device by using a second antenna in the plurality of antennas, where the first antenna and the second antenna are different antennas in the plurality of antennas.

The transceiver is further configured to receive an indication for a first transceiving delay from the second device, where the first transceiving delay is a delay from a time at which the second device transmits the first packet to a time at which the second device receives the second packet.

The processor is configured to invoke a computer program stored in the memory, to determine an RTT between the first device and the second device based on a calibration delay from the second antenna to the first antenna, a recording moment at which the first device receives the first packet, a recording moment at which the first device transmits the second packet, and the first transceiving delay, where the calibration delay from the second antenna to the first antenna is a delay in receiving, by the first device by using the first antenna, a wireless signal transmitted by the second antenna.

Optionally, the transceiver is further configured to transmit a third packet to a third device by using a third antenna, and receive a fourth packet from the third device by using a fourth antenna. The third antenna and the fourth antenna are different antennas in the first device, the third antenna and the foregoing second antenna may be a same antenna, and the fourth antenna and the foregoing first antenna may be a same antenna. The processor is further configured to calibrate, based on a calibration delay from the third antenna to the fourth antenna, a recording moment at which the first device transmits the third packet and/or a recording moment at which the first device receives the fourth packet, to obtain an indication for a second transceiving delay, and the second transceiving delay is a delay from a time at which the first device transmits the third packet to a time at which the first device receives the fourth packet. The calibration delay from the third antenna to the fourth antenna is a delay in receiving, by the first device by using the fourth antenna, a wireless signal transmitted by the third antenna. The transceiver is further configured to transmit the indication for the second transceiving delay to the third device.

Optionally, the processor is configured to invoke a computer program stored in the memory, to control the transceiver to transmit a calibration signal by using the second antenna and receive the calibration signal by using the first antenna. The processor is further configured to measure a delay for the calibration signal, and record the delay for the calibration signal in the memory as the calibration delay from the second antenna to the first antenna.

Optionally, the memory stores a plurality of groups of correspondences between calibration delays and transmit and receive antennas. The processor is configured to obtain, from the memory, a calibration delay corresponding to transmit and receive antennas, where the transmit antenna is the second antenna and the receive antenna is the first antenna, and use the calibration delay as the calibration delay from the second antenna to the first antenna.

For example, the first device may be the device 20 shown in FIG. 2. The computer program stored in the memory 202 may include one or more software modules. The one or more software modules may be the software modules provided in any one of the embodiments in FIG. 7 or FIG. 9. The processor 201 is configured to invoke a computer program, and cooperate with the transceiver 203 to implement the time measurement method provided in the foregoing method embodiments. The transceiver 203 is configured to perform a transmitting or receiving action of the first device in the foregoing method embodiment. Optionally, the memory 202 is further configured to store correspondences between a plurality of groups of calibration delays and transmit and receive antennas, so that the processor 201 or the transceiver 203 can invoke the correspondences.

An embodiment of this application further provides a time measurement system. The time measurement system includes two devices, and at least one device is the device shown in FIG. 2 or the first device shown in any one of FIG. 7 to FIG. 9.

An embodiment of this application further provides a computer-readable storage medium. The computer-readable storage medium stores an instruction. When the instruction is executed by a processor, the time measurement method in the foregoing method embodiments is implemented.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

In the embodiments of this application, the terms "first", "second", and "third" are merely used for description, but cannot be understood as an indication or implication of relative importance.

The term "and/or" in this application describes only an association relationship for describing associated objects and indicates that three relationships may exist. For example, A and/or B may indicate the following three cases: only A exists, both A and B exist, and only B exists. In addition, the character "/" in this specification usually indicates an "or" relationship between the associated objects.

The foregoing descriptions are merely optional embodiments of this application, but are not intended to limit this application. Any modification, equivalent replacement, or improvement made within the concept and principle of this application should fall within the protection scope of this application.

What is claimed is:

1. A method implemented by a first device, wherein the method comprises:
    receiving, from a second device and using a first antenna, a first packet;
    transmitting, to the second device and using a second antenna, a second packet, wherein the first antenna and the second antenna are in the first device;
    receiving, from the second device, a first indication for a first transceiving delay, wherein the first transceiving delay is from a first time at which the second device transmits the first packet to a second time at which the second device receives the second packet;
    obtaining a first calibration delay from the second antenna to the first antenna, wherein the first calibration delay is obtained according to a first formula:

$$\Delta T1 = t2 - t1,$$

wherein $\Delta T1$ is the first calibration delay, wherein $t1$ is a first recording moment at which the second antenna transmits a calibration signal, and wherein $t2$ is a second recording moment at which the first antenna receives the calibration signal; and
    calculating a round-trip time (RTT) between the first device and the second device based on the first calibration delay, a third recording moment at which the first device receives the first packet, a fourth recording moment at which the first device transmits the second packet, and the first transceiving delay.

2. The method of claim 1, wherein the first indication comprises a value of the first transceiving delay.

3. The method of claim 1, further comprising:
    transmitting, using the second antenna, the calibration signal;
    receiving, using the first antenna, the calibration signal;
    measuring a delay for the calibration signal; and
    recording the delay for the calibration signal as the first calibration delay.

4. The method of claim 1, further comprising obtaining the RTT using a second formula, wherein the second formula is:

$$RTT = \Delta T2 - (t4 - t3) - \Delta T1,$$

wherein $\Delta T1$ is the first calibration delay, wherein $t3$ is the third recording moment, wherein $t4$ is the fourth recording moment, and wherein $\Delta T2$ is the first transceiving delay.

5. The method of claim 1, wherein a quantity of antennas in the first device is greater than 2, and wherein the first antenna and the second antenna that correspond to the second device and that have a maximum received signal strength in a plurality of antennas in the first device.

6. The method of claim 1, further comprising:
    recording a plurality of groups of correspondences between first calibration delays and transmit and receive antennas; and
    setting, in response to a correspondence that is recorded in the first device and that is between a target calibration delay and transmit antenna and receive antenna, the target calibration delay as the first calibration delay, wherein the transmit antenna is the second antenna, and wherein the receive antenna is the first antenna.

7. The method of claim 1, wherein the first packet is a fine timing measurement (FTM) frame, and wherein the second packet is an acknowledgment frame.

8. The method of claim 1, further comprising:
    transmitting, to a third device and using a third antenna, a third packet;
    receiving, from the third device and using a fourth antenna, a fourth packet, wherein the third antenna and the fourth antenna are different antennas in the first device;
    obtaining a second calibration delay from the third antenna to the fourth antenna;
    calibrating, based on the second calibration delay and a fifth recording moment at which the first device transmits the third packet or a sixth recording moment at which the first device receives the fourth packet, to obtain a second indication for a second transceiving delay, wherein the second transceiving delay is from a third time at which the first device transmits the third packet to a fourth time at which the first device receives the fourth packet; and
    transmitting, to the third device, the second indication.

9. The method of claim 8, further comprising:
    obtaining a transmitting timestamp at which the first device transmits the third packet by calibrating based on the second calibration delay and the fifth recording moment; or
    obtaining a receiving timestamp at which the first device receives the fourth packet by calibrating based on the second calibration delay and the sixth recording moment,
    wherein the second indication comprises a second value of the second transceiving delay or the transmitting timestamp and the receiving timestamp.

10. The method of claim 8, further comprising obtaining the second transceiving delay using a second formula, wherein the second formula is:

$$\Delta T4 = t6 - t5 - \Delta T3,$$

wherein $\Delta T4$ is the second transceiving delay, wherein t5 is the fifth recording moment, wherein t6 is the sixth recording moment, and wherein $\Delta T3$ is the second calibration delay.

11. The method of claim 1, wherein the first indication comprises a transmitting timestamp at which the second device transmits the first packet and a receiving timestamp at which the second device receives the second packet.

12. The method of claim 1, wherein the first antenna and the second antenna are different antennas of the first device, wherein the first device comprises a plurality of antennas, and wherein the method further comprises:
   selecting one of the plurality of antennas with a second highest received signal strength as the first antenna for receiving the first packet; and
   selecting a second one of the plurality of antennas with a highest receives signal strength as the second antenna for transmitting the second packet.

13. A first device, comprising:
a plurality of antennas comprising:
   a first antenna; and
   a second antenna; and
a transceiver coupled to the antennas and configured to:
   receive, from a second device using the first antenna, a first packet;
   transmit, to the second device and using the second antenna, a second packet;
   receive, from the second device, an indication for a transceiving delay, wherein the transceiving delay is from a first time at which the second device transmits the first packet to a second time at which the second device receives the second packet; and
   calculate a round-trip time (RTT) between the first device and the second device based on a calibration delay, a first recording moment at which the first device receives the first packet, a second recording moment at which the first device transmits the second packet, and the transceiving delay,
   wherein the calibration delay is obtained according to a first formula:

$$\Delta T1 = t2 - t1,$$

wherein $\Delta T1$ is the calibration delay, wherein t1 is a third recording moment at which the second antenna transmits a calibration signal, and wherein t2 is a fourth recording moment at which the first antenna receives the calibration signal.

14. The first device of claim 13, wherein the first antenna and the second antenna are different antennas of the first device, and wherein the transceiver is further configured to:
   select one of the plurality of antennas with a second highest received signal strength as the first antenna for receiving the first packet; and
   select a second one of the plurality of antennas with a highest receives signal strength as the second antenna for transmitting the second packet.

15. A first device, comprising:
a plurality of antennas comprising:
   a first antenna; and
   a second antenna;
a transceiver coupled to the antennas and configured to:
   receive, from a second device and using the first antenna, a first packet;
   transmit, to the second device and using the second antenna, a second packet;
   receive, from the second device, an indication for a transceiving delay, wherein the transceiving delay is from a first time at which the second device transmits the first packet to a second time at which the second device receives the second packet; and
a processor coupled to the antennas and the transceiver and configured to:
   obtain a calibration delay from the second antenna to the first antenna, wherein the calibration delay is obtained according to a first formula:

$$\Delta T1 = t2 - t1,$$

wherein $\Delta T1$ is the calibration delay, wherein t1 is a first recording moment at which the second antenna transmits a calibration signal, and wherein t2 is a second recording moment at which the first antenna receives the calibration signal; and
   calculate a round-trip time (RTT) between the first device and the second device based on the calibration delay, a third recording moment at which the first device receives the first packet, a fourth recording moment at which the first device transmits the second packet, and the transceiving delay.

16. The first device of claim 15, wherein the indication comprises a value of the transceiving delay.

17. The first device of claim 15, wherein the indication comprises a transmitting timestamp at which the second device transmits the first packet and a receiving timestamp at which the second device receives the second packet.

18. The first device of claim 15, wherein the transceiver is further configured to:
   transmit, using the second antenna, the calibration signal;
   receive, using the first antenna, the calibration signal, and wherein the processor is further configured to:
      measure a delay for the calibration signal; and
      record the delay for the calibration signal as the calibration delay.

19. The first device of claim 15, wherein the processor is further configured to obtain the RTT using a second formula, wherein the second formula is:

$$RTT = \Delta T2 - (t4 - t3) - \Delta T1,$$

wherein $\Delta T1$ is the calibration delay, wherein t3 is the third recording moment, wherein t4 is the fourth recording moment, and wherein $\Delta T2$ is the transceiving delay.

20. The first device of claim 15, wherein a quantity of antennas in the first device is greater than 2, and wherein the first antenna and the second antenna are two antennas that correspond to the second device and that have maximum received signal strength in the antennas.

* * * * *